(12) United States Patent
Sandoi et al.

(10) Patent No.: US 9,414,431 B2
(45) Date of Patent: Aug. 9, 2016

(54) METHOD OF DISCONTINUOUS TRANSMISSION DETECTION

(71) Applicants: Bodgan-Mihai Sandoi, Bucharest (RO); Anton Antal, Bucharest (RO); Andrei-Alexandru Enescu, Bucharest (RO); Andrei Gansari, Bucharest (RO)

(72) Inventors: Bodgan-Mihai Sandoi, Bucharest (RO); Anton Antal, Bucharest (RO); Andrei-Alexandru Enescu, Bucharest (RO); Andrei Gansari, Bucharest (RO)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 136 days.

(21) Appl. No.: 14/253,489

(22) Filed: Apr. 15, 2014

(65) Prior Publication Data

US 2015/0237674 A1 Aug. 20, 2015

(30) Foreign Application Priority Data

Feb. 14, 2014 (RO) .................................. 2014 00120

(51) Int. Cl.
*H04W 24/00* (2009.01)
*H04W 76/04* (2009.01)

(52) U.S. Cl.
CPC .................................. *H04W 76/048* (2013.01)

(58) Field of Classification Search
None
See application file for complete search history.

(56) References Cited

U.S. PATENT DOCUMENTS

| 6,782,059 | B2 | 8/2004 | Lin |
| 7,061,999 | B2 | 6/2006 | Chen |
| 7,143,178 | B2 | 11/2006 | Glazko et al. |
| 7,180,881 | B2 | 2/2007 | DiFazio |
| 7,437,172 | B2 | 10/2008 | Chen et al. |
| 7,782,820 | B2 * | 8/2010 | Dominique ............. H04L 1/005 370/328 |
| 8,086,257 | B2 | 12/2011 | Bachl et al. |
| 9,167,522 | B2 * | 10/2015 | Das ......................... H04L 1/201 370/328 |
| 2004/0081097 | A1 | 4/2004 | Dominique et al. |
| 2004/0203463 | A1 | 10/2004 | Chen et al. |
| 2004/0240529 | A1 | 12/2004 | Leonard et al. |
| 2006/0013163 | A1 | 1/2006 | Lee et al. |

FOREIGN PATENT DOCUMENTS

WO 2008141476 A1 11/2008

OTHER PUBLICATIONS

U.S. Appl. No. 14/253,457, filed Apr. 15, 2014, entitled "Method of DTX Detection in a Wireless Communication System".
Non-Final Office Action mailed Nov. 4, 2015 for U.S. Appl. No. 14/253,457, 8 pages.

* cited by examiner

Primary Examiner — Frank Duong

(57) ABSTRACT

A network node of a wireless communication network comprises a receiver receiving an input signal from a remote transmitter of the wireless communication system via a transmission channel. A signal to noise ratio calculator is arranged to calculate a signal to noise ratio of the received input signal. A soft bit normalizer is arranged to determine a plurality of normalized soft bits using the input signal. A primary detector is arranged to detect a discontinuous transmission on the transmission channel using the plurality of the normalized soft bits and the signal to noise ratio, and if a discontinuous transmission on the transmission channel is detected, generate a DTX-decision or else trigger a refinement detector. The refinement detector is arranged to decode the normalized soft bits and to generate a further decision about whether the signal indicates a discontinuous transmission on the transmission channel using the decoded normalized soft bits.

20 Claims, 9 Drawing Sheets

METHOD OF DISCONTINUOUS TRANSMISSION DETECTION

CROSS REFERENCE TO RELATED APPLICATIONS

The present application is claims priority to Romanian Patent Application No. 2014 00120, filed Feb. 14, 2014, entitled "METHOD OF DISCONTINUOUS TRANSMISSION DETECTION," and is related to co-pending U.S. patent application Ser. No. 14/253,457, entitled "METHOD OF DTX DETECTION IN A WIRELESS COMMUNICATION SYSTEM," filed on Apr. 15, 2014, the entirety of which are herein incorporated by reference.

FIELD OF THE INVENTION

This invention relates to a communication system and more particularly to a wireless communication system.

BACKGROUND OF THE INVENTION

In wireless (tele-)communication networks, a continuously active channel, e.g. between a mobile phone and a base-station, is preferable when the anticipated data transmission is continuous. With a continuously active channel, the user is able to efficiently transmit or receive a continuous data stream over the allocated active channel. However, the exploding increase of packet data applications, such as those used when communicating over the Internet, make allocating a continuously active channel to a single user an over allocation of resources. Control signals sent from a base station to a mobile station or messaging may occur only infrequently and it may not be desirable to allocate a continuously active channel for a limited purpose.

Accordingly, wireless networks may allow a signal to be transmitted discontinuously, i.e. communication to a receiver over a channel does not occur continuously, but may be cycled on and off. The interval during which the signal is not transmitted is generally referred to as DTX. The receiver is then faced with the problem of determining when a signal was transmitted, or when there is a lack of a signal, i.e. requires some DTX detection mechanism.

Under ideal circumstances the receiver would demodulate the transmitted signals as they arrive and realize that lack of a signal to demodulate indicates that the transmitter is engaging in DTX, and is in fact not transmitting a signal. However, a real world communication link does not operate under ideal channel conditions, nor does a real world receiver operate with an ideal demodulator. Thus, whilst a receiver may easily make detect DTX under ideal channel conditions, in reality signal multipath, fading, path loss, noise, and interference corrupt the signal incident on the receiver. Additionally, in reality the receiver demodulator will not exhibit ideal characteristics and not every received signal may be accurately demodulated. The result of this is that DTX non-ideal characteristics is that a receiver demodulating a continuously transmitted signal will occasionally be unable to recover the transmitted data unless computationally expensive DTX solutions are used.

Accordingly, known DTX detection systems either lack accuracy because designed for ideal circumstances or have a high computational overhead to cope with the real world operating circumstances.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

In this description, the following abbreviations are used:

| Term | Meaning |
|---|---|
| 3GPP | The 3rd Generation Partnership Project |
| BPSK | Binary Phase Shift Keying |
| DL | Downlink |
| DPCCH | Dedicated Physical Control Channel |
| DTX | Discontinuous transmission |
| E-DCH | Enhanced Dedicated Channel |
| E-DPCCH | Enhanced Dedicated Physical Control Channel |
| E-DPDCH | Enhanced Dedicated Physical Data Channel |
| FA | False Alarm |
| HSUPA | High-Speed Uplink Packet Access |
| L1 | Layer 1 (as in OSI model) |
| LUT | Lookup Table |
| MD | Missed Detection |
| PSK | Phase Shift Keying |
| QPSK | Quadrature Phase Shift Keying |
| SNR | Signal to Noise Ratio |
| TTI | Transmission Time Interval |
| UE | User Equipment |
| UL | Uplink |
| UMTS | Universal Mobile Telecommunications System |
| WCDMA | Wideband Code Division Multiple Access |

Figure 1A:
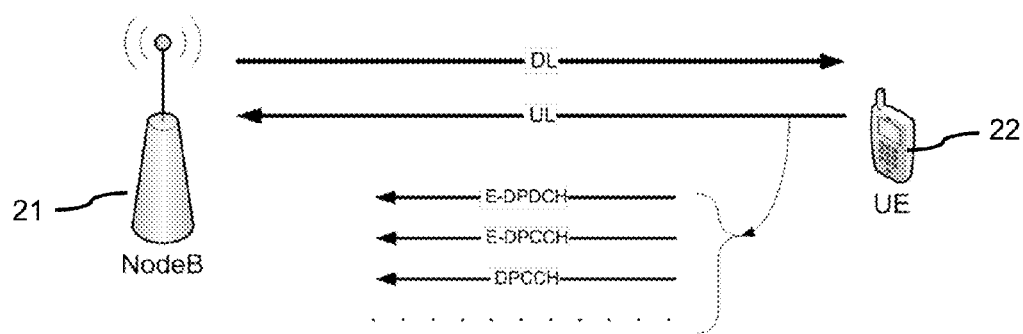
FIG. 1A shows an example of a network with a network node.

FIG. 1A shows an example of a network 20 comprising a network node 21 and a user equipment (UE) 22. The network node 21 and the UE 22 are connected via a wireless communication channel, which allows the network node 21 and the UE to exchange data.

The network may be any suitable type of network and have any suitable type of topology FIG. 1A shows only one network node 21 and one user equipment 22, connected to each other via a wireless point-to-point channel. However it will be apparent that the network may comprise a plurality of nodes and a plurality of UE's and have any suitable topology. For example, the network may comprise several network nodes 21, each connectable to one or more UE's at the same time, and the network nodes 21 being connected to each other through a suitable wired network. The UE's may e.g. be connected to a single network node 21, and for example switch over to another network node 21 if moved to another position.

In the shown example, the network is a mobile telecommunication networks, such as the Universal Mobile Telecommunications System (UMTS), and the network node 21 is a base station arranged to communicate with a plurality of mobile telephones or other type of device used directly by an end-user to communicate, such as a laptop computer with a suitable adaptor, a tablet computer or otherwise, hereinafter referred to as a User Equipment or UE.

The wireless channel may be any suitable channel. The channel may e.g. be a data channel or a control channel. The channel may e.g. be used without training sequence (also known as pilot sequence) preceding the communication. The channel may e.g. be an uplink channel (for transmission of data from the UE to the network node), or be a downlink channel (for transmission of data from the network node to the UE). For example, the channel may be the Enhanced Dedicated Physical Control Channel (E-DPCCH) channel, as used in the High-Speed Uplink Packet Access (HSUPA) protocol in a UMTS network.

Any suitable communication protocol may be used to exchange, either uni- or bidirectional, data over the wireless channel.

Figure 1B:
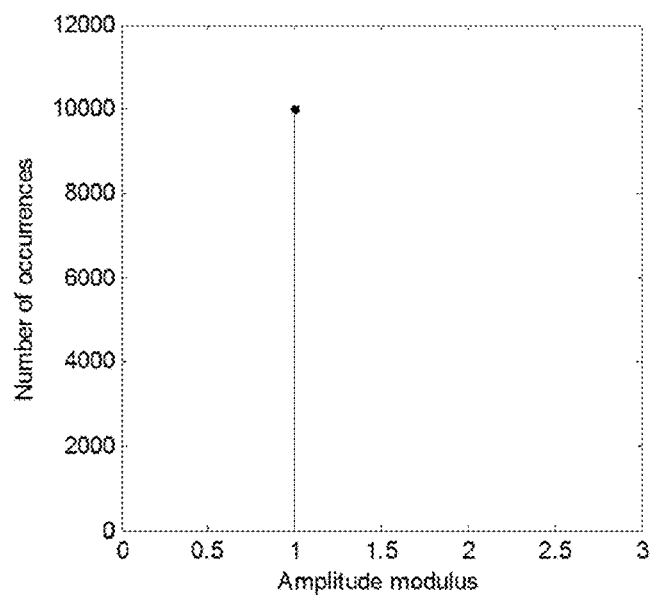
FIG. 1B shows a histogram of a symbol amplitude modulus a receiver would expect in the absence of noise.
Figure 1C:
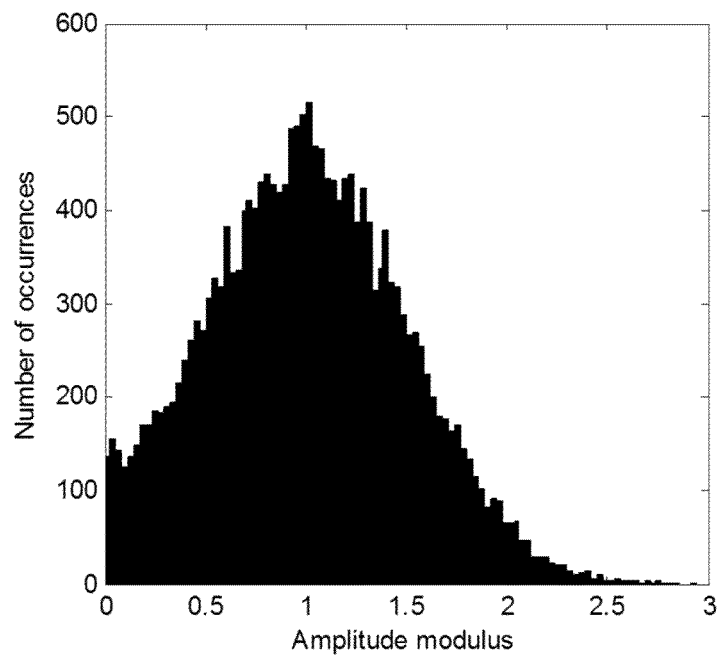
FIG. 1C shows a histogram of a symbol amplitude modulus a receiver receives in a real life situation.
Figure 1D:
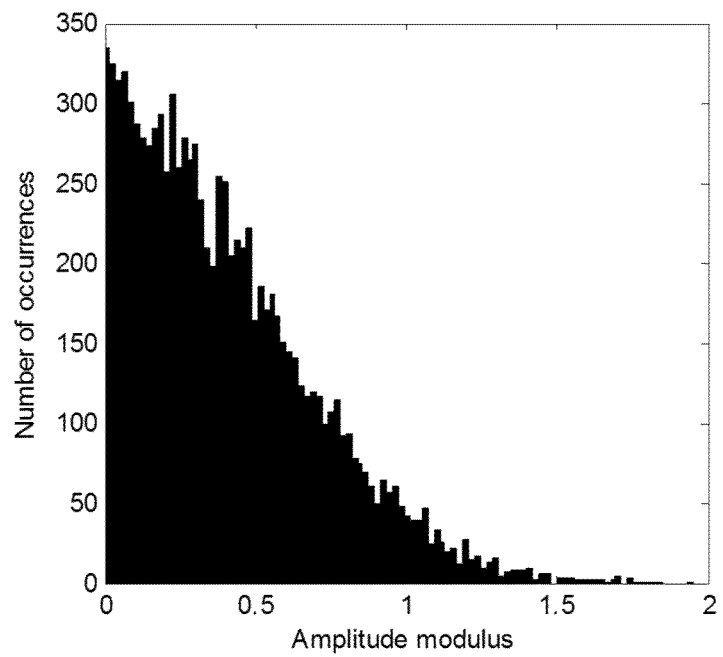
FIG. 1D shows a histogram of a symbol amplitude modulus a receiver receives if nothing is transmitted over the channel.

If bits to be transmitted are BPSK modulated, a number of so-called symbols are generated with amplitudes of +1 (corresponding to bit 0) or −1 (corresponding to bit 1). Consequently, in case of transmission in an ideal environment without any noise, at the receiver we would expect the symbol amplitude modulus to be always 1 as in the histogram shown in FIG. 1B. In a real environment with noise, the amplitude modulus would instead look like in the histogram shown in FIG. 1C. But if nothing were transmitted (as in DTX), there would be only noise at the receiver, resulting in an amplitude modulus like in the histogram of FIG. 1D. As can be seen from FIGS. 1C and 1D, there is a significant overlap of the distributions.

In BPSK transmissions only two discrete values are sent 1 and −1. These are correlated with the bits to be transmitted. One possible example is: Bit "0"->Transmit signal level "1", Bit "1"->Transmit signal level "−1". It is expected that a received value Y[n] to have been affected by the communication channel and noise Y[n]=∓γ+noise, where ∓ is the channel attenuation.

In PSK transmissions in general the so-called Soft Bits are obtained after symbol demapping as will be known by the skilled person. Below, a Normalized Soft Bit is referring to a Soft Bit whose channel amplitude attenuation has been compensated, so Z[n]=Y[n]/γ, where Y[n] represents a soft bit and Z[n] represents a normalized soft bit.

Figure 2:
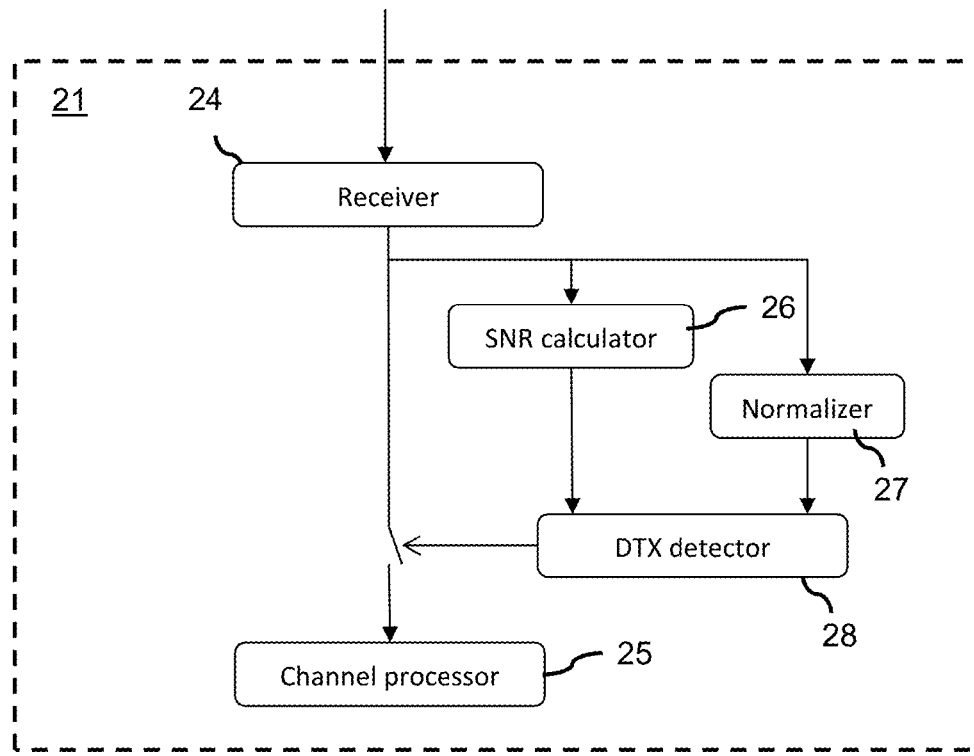
FIG. 2 shows a block diagram of an example of a network node suitable for the example of FIG. 1A.
Figure 3:
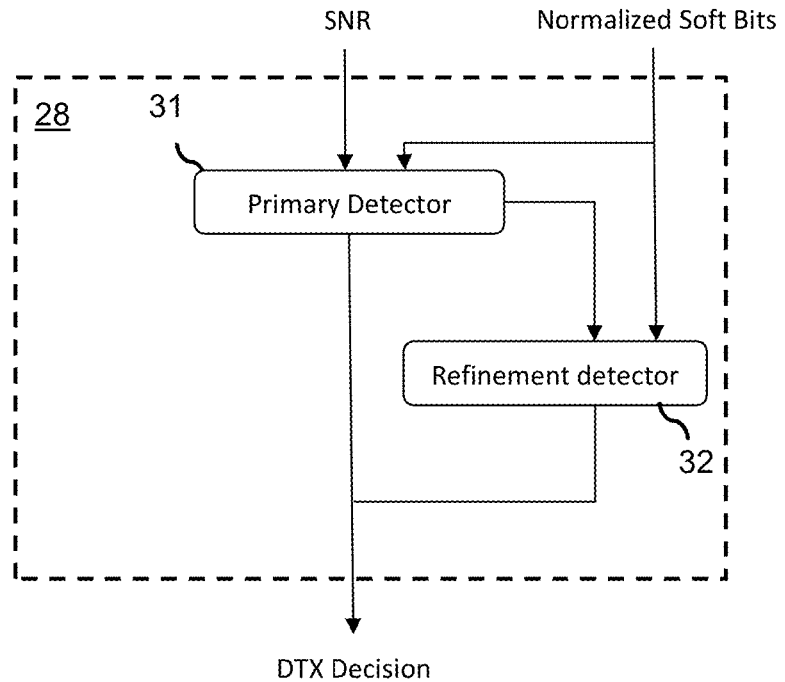
FIG. 3 shows a block diagram of a DTX detector suitable for the example of FIG. 2 or 5.

The DTX detector may be implemented in any manner suitable for the specific implementation. FIG. 3 shows for instance an example of a DTX detector 28 suitable for the example of FIG. 2. The DTX detector 28 comprises a primary detector 31 arranged for detecting a discontinuous transmission on the transmission channel using the plurality of the normalized soft bits and the signal to noise ratio. The primary detector will generate a DTX-detected decision if a discontinuous transmission is detected or otherwise generate a trigger. The trigger is activating a refinement detector 32 for making a further (more refined) decision. The refinement detector 32 is connected with a respective input to the output of the primary detector 31 to receive the trigger from the primary detector 31. If the refinement detector is activated it will decode the normalized soft bits. The further decision about whether the received input signal indicates a discontinuous transmission on the transmission channel is now generated using the decoded soft bits.

Figure 4A:
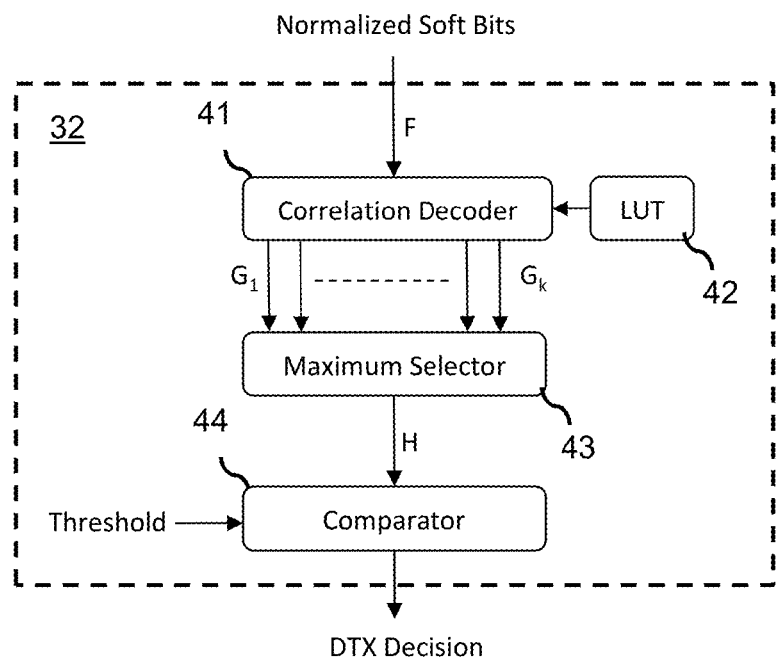
FIG. 4A shows a block diagram of a refinement detector suitable for the example of FIG. 2 or 5.

The refinement detector 32 may be implemented in any manner suitable for the specific implementation. FIG. 4A shows for instance an example of a refinement detector 32 suitable for the example of FIG. 3. The refinement detector 32 comprises a correlation decoder 41 for correlating the normalized soft bits with each of a plurality of predefined bit sequences to obtain a plurality of correlations. The predefined bit sequences may be stored in a look up table 42. The look up table (LUT) 42 may be part of the refinement detector 32 but may alternatively be arranged in a different module. The look up table 42 may e.g. contain all the possible E-DPCCH sequences which could be received.

The Correlation Decoder 41 may correlate the input normalized soft bits, with every sequence found in the LUT, for example by performing an operation as can be described by the mathematical formula:

$$G_p = \frac{1}{N}\sum_{i=1}^{N} F_i * J_{p,i}$$

In which $F_i$ represents the i-th input soft bit, $J_{p,i}$ represents i-th element of the p-th E-DPCCH possible sequence N represents the number of elements in an E-DPCCH TTI and is a positive integer;

$G_p$ represents the result of correlating input soft bits with the p-th sequence in the LUT;

i,p representing positive integers.

The refinement detector 32 also comprises a maximum selector 43 and a comparator 44. The maximum selector 43 is arranged to select a maximum correlation out of the pluralities of correlations. The correlation with the maximum amplitude corresponds to the sequence which is most likely to be transmitted. The comparator 44 is arranged to compare the selected maximum correlation with a correlation threshold. The comparator 44 will generate a DTX-detected decision (i.e. no signal transmission) if the maximum correlation is smaller than the correlation threshold.

Figure 4B:
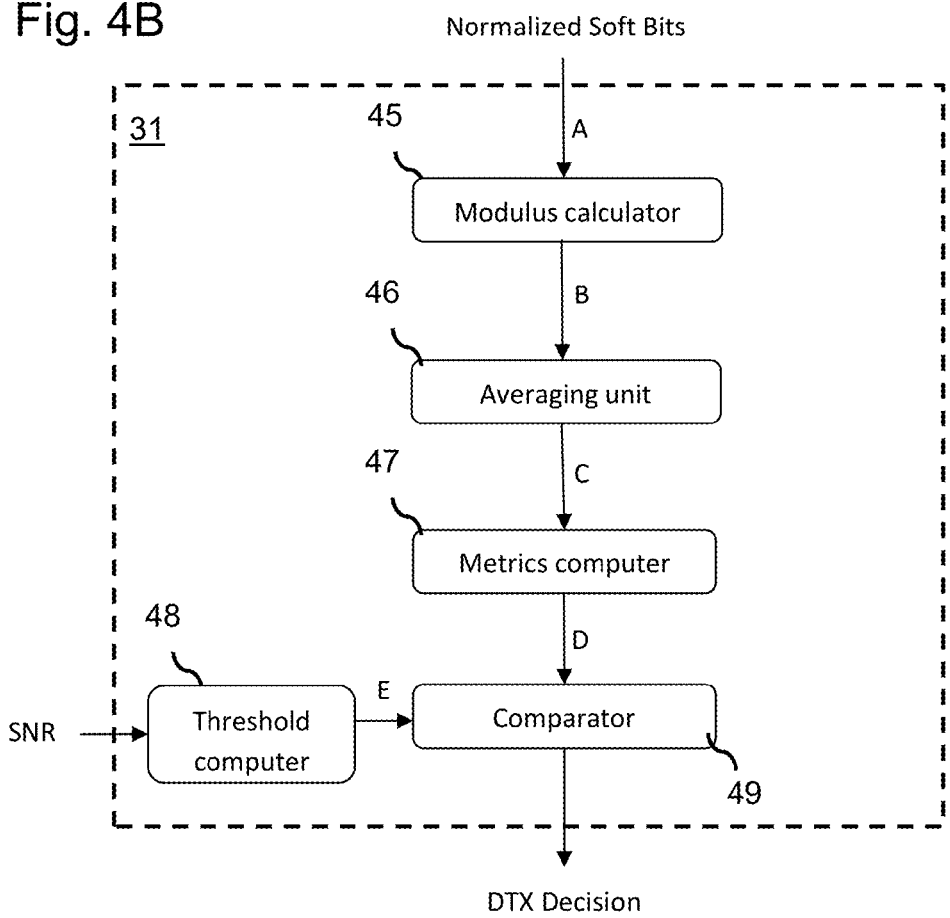
FIG. 4B shows a block diagram of a primary detector suitable for the example of FIG. 2 or 5.

FIG. 4B shows an embodiment of the primary detector 31. The primary detector 31 comprises a modulus calculator 45 arranged to calculate a modulus of each normalized soft bit, to obtain a plurality of moduli. An averaging unit 46 is arranged to average the plurality of moduli over a period equal to a Transmission Time Interval (TTI) to obtain an average value C. A metrics computer 47 is arranged to compute a DTX metric using a polynomial function of the average value C. The DTX metric may be calculated using the formula:

$$D = a_1 \times C + a_2 \times C^2$$

with D being the value of the DTX metric, C being the average and a1 and a2 being real numbered coefficients.

The coefficient a1 may have any suitable value. Suitable values of the coefficient $a_1$ have for example found to be between −3.5 and −2.5, and an especially effective value is −3.0366. The coefficient $a_2$ may have any suitable value Suitable values of the coefficient $a_2$ have been found to be between 32 and 33 and an especially effective value is 32.8986.

The primary detector 31 further comprises a threshold computer 48 arranged to compute a threshold E using a polynomial function of the signal to noise ratio (SNR). The threshold E is input for a comparator 49. The comparator 49 is arranged to decide that the signal indicates a discontinuous transmission if the threshold E is larger than a value of the DTX metric, or else decide that the signal does not indicate a discontinuous transmission. The threshold E may be calculated using formula:

$$E = b_1 + b_2 \times SNR$$

with $b_1$ and $b_2$ being real numbered coefficients and SNR being the signal to noise ratio.

The coefficients $b_1$ and $b_2$ may have any suitable value. Suitable values of the coefficient b1 have found to be ie between −11 and −10, e.g. −10.401, and Suitable values of the coefficient b2 have found to be between 0 and 1, e.g. 0.3441. If E>D, the comparator 49 decides that the input signal was in DTX and DTX will be reported. Else, a non-DTX will be reported.

Figure 5:
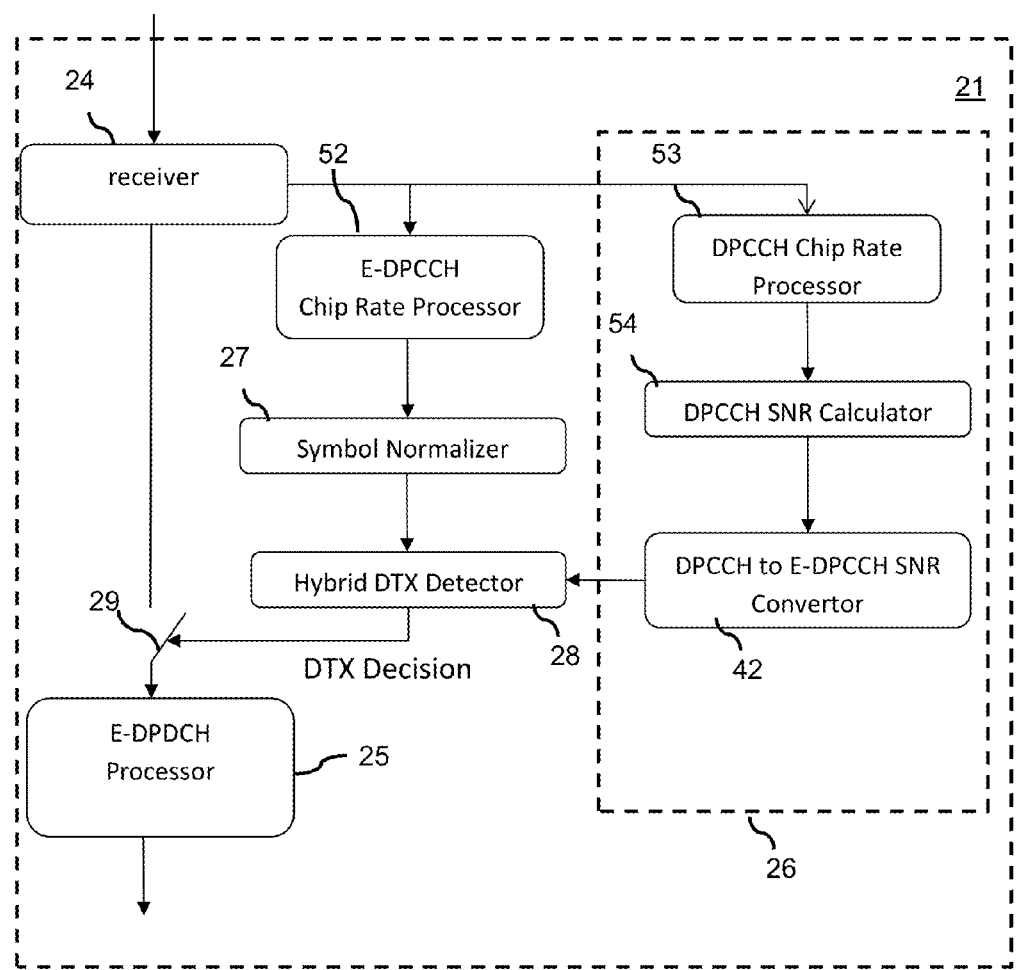
FIG. 5 shows a block diagram of another example of a network node suitable for the example of FIG. 1A.

FIG. 5 shows a further example of the network node 21. In this example of FIG. 5, the network node 21 comprises a receiver 24 and an E-DPDCH processor 25 for decoding the received signals. However, if DTX was detected, no E-DPDCH further processing is performed. This is indicated in FIG. 5 by an open switch 29. The switch is controlled by the DTX detector 28. The DTX detector 28 receives normalised symbols from the symbol normalizer 27 and a SNR value from the SNR calculator 26. The symbol normalizer 27 receives input from an E-DPCCH chip rate processor 52. The E-DPCCH Chip Rate Processor 52 performs descrambling, despreading and Maximum Ratio Combining of the input baseband samples output by the receiver 24.

In this specific embodiment, the SNR calculator 26 comprises a DPCCH chip rate processor 53, for receiving a further input signal on an adjacent channel, i.e. the DPCCH channel. This DPCCH signal comprising a pilot sequence of known bits. These known bits can be used to calculate a SNR value for the DPCCH channel which is related to the SNR of the E-DPCCH channel. A signal to noise ratio calculator 54 is arranged to calculate a further signal to noise ratio on the adjacent channel using the pilot sequence. A converter 42 is arranged to convert the further signal to noise ratio into the signal to noise ratio. The signal to noise ratio may be calculated by performing an operation as can be described by the mathematical formula:

$$SNR_{EDPCCH} = \beta_{ec} * SNR_{DPCCH}$$

with $SNR_{EDPCCH}$ being the signal to noise ratio,
$SNR_{DPCCH}$ being the further the signal to noise ratio on the Dedicated Physical Control Channel,
$\beta_{ec}$ being a power ratio.

The value of the power ratio $\beta_{ec}$ is known to the network node 21. This value is received from the core network by way of core network communication protocols.

It is noted that the calculation of a further signal to noise ratio of an adjacent channel is not limited to WCDMA and can be used with other standards. More generally, the network node 21 may comprise a signal to noise ratio calculator comprising a receiver arranged to receive a further input signal on an adjacent channel, the further signal comprising a pilot sequence of known bits. It may also comprise a further signal to noise ratio calculator arranged to calculate a further signal to noise ratio on the adjacent channel using the pilot sequence. The network node 21 may comprise converter arranged to convert the further signal to noise ratio into the signal to noise ratio. The converter may be arranged to convert the further signal to noise ratio into the signal to noise ratio using a predetermined conversion factor, such as the power ratio $\beta_{ec}$.

Figure 6:
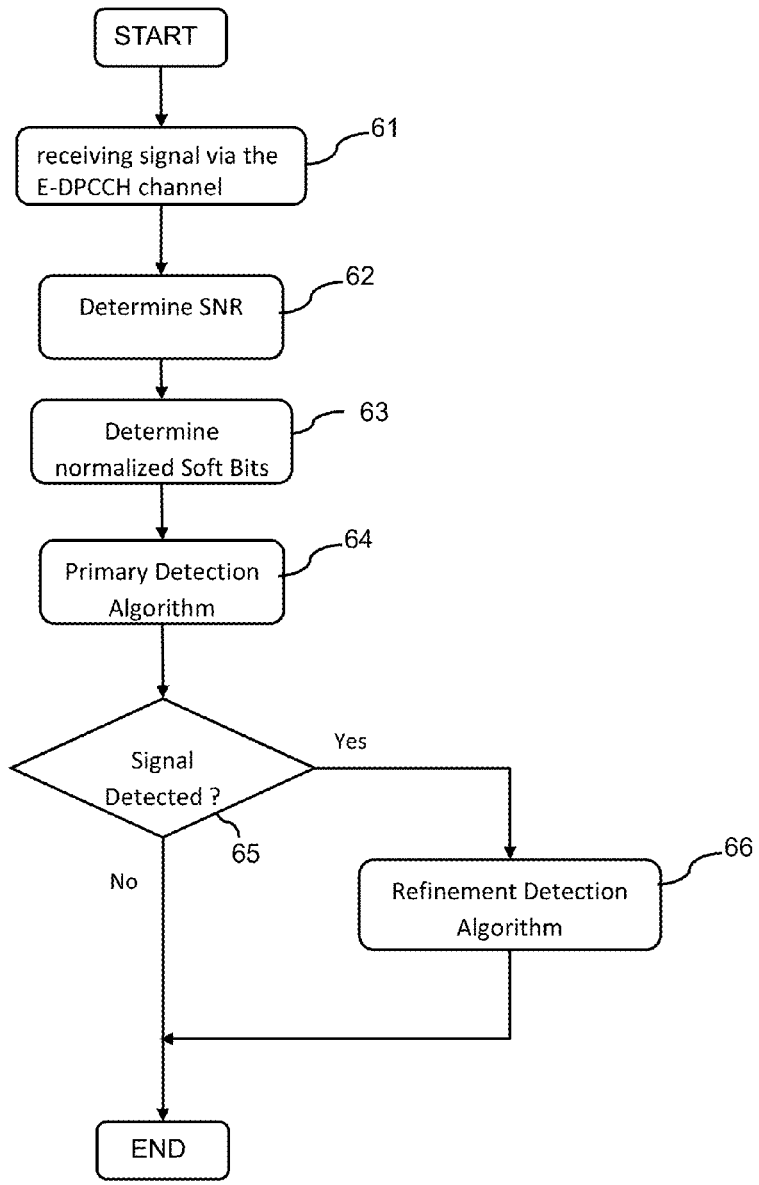
FIG. 6 is a flow chart of a method of Discontinuous Transmission detection for a Phase Shift Keying modulated signal.

There is also provided a method of Discontinuous Transmission detection on a transmission channel in a wireless communication network. In an embodiment the method of Discontinuous Transmission detection is suitable for detecting a Phase Shift Keying modulated signal. The Phase Shift Keying modulated signal may be a signal transmitted via the E-DPCCH channel in a UMTS communication network. An embodiment of this method is discussed below with reference to FIG. 6. The method comprises the receiving of an input signal via a transmission channel, see action 61. Next in an action 62 a signal to noise ratio of the received input signal is calculated (i.e. determined) followed by the determining a plurality of normalized soft bits using the input signal, see action 63. Once the signal to noise ratio and the plurality of normalized soft bits are determined, a primary algorithm 64 is performed to detect a possible signal on the transmission channel. If a signal is detected, see test 65, a second detection algorithm 66 (also referred to as refinement algorithm) is performed. If no signal is detected, the method stops without performing the refinement algorithm.

Figure 7:
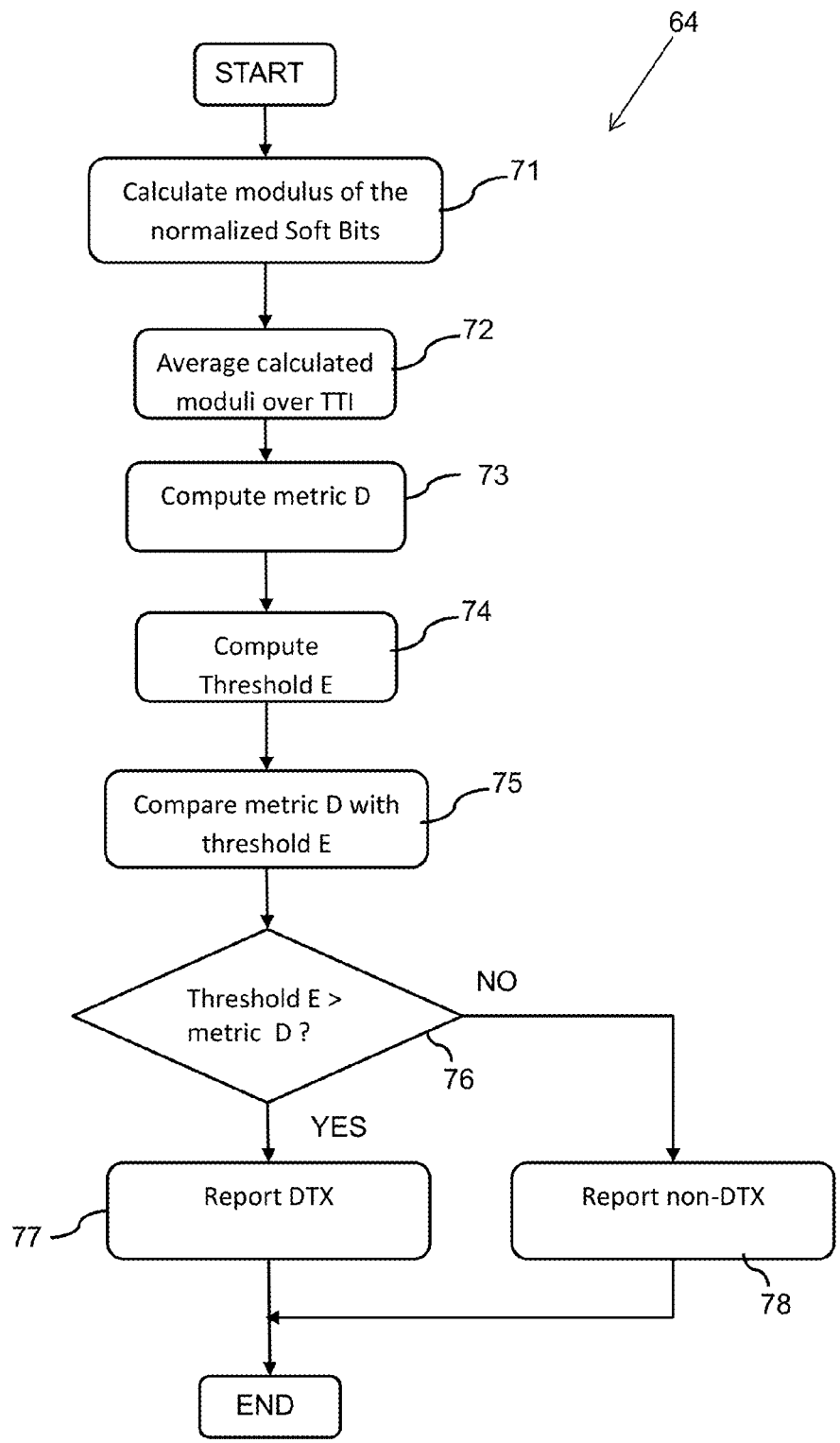
FIG. 7 is a flow chart of an embodiment of the primary detection algorithm/method.

FIG. 7 is a flow chart of an embodiment of the primary detection algorithm/method. The method starts with an action 71 in which a modulus of each normalized soft bit is calculated to obtain a plurality of moduli. In an action 72, an averaging of the plurality of moduli over a period equal to a Transmission Time Interval is done to obtain an average value C. Then in an action 73, a DTX metric is computed using a polynomial function of the average value C. In an action 74 a threshold E is computed using a polynomial function of the signal to noise ratio. If the threshold E is larger than a value of the DTX metric, see test 76, an action 77 follows in which it is decided that the signal indicates a discontinuous transmission and this DTX is reported to the E-DPDCH processing switch 29 (in FIG. 5) in order to bypass E-DPDCH processing. If the result of the test 76 is NO, it is decided that the signal does not indicate a discontinuous transmission, and a non-DTX is reported, see action 78.

Figure 8:
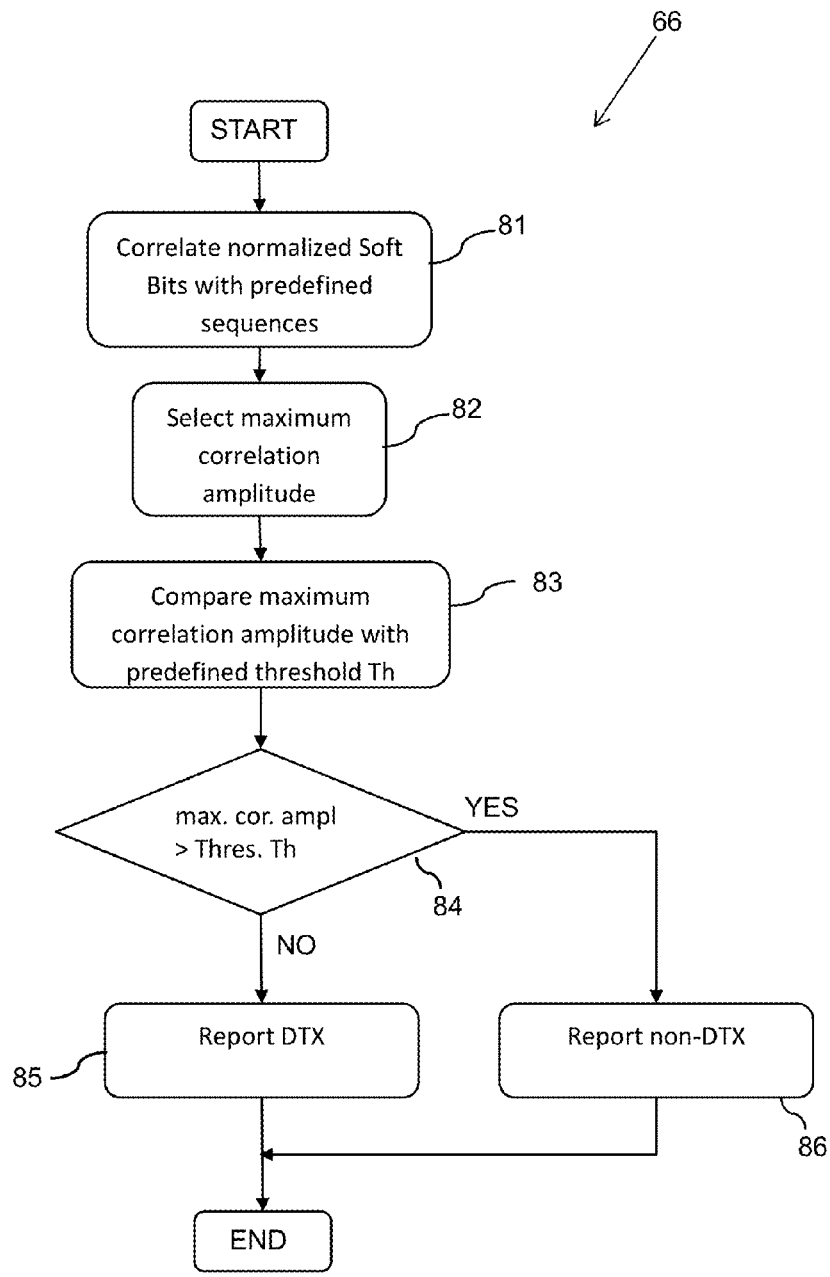
FIG. 8 is a flow chart of an embodiment of the refinement algorithm.

FIG. 8 is a flow chart of an embodiment of the refinement algorithm 66. At the start of the refinement algorithm 66 the decoding is done of the normalized soft bits. This decoding may comprise correlating the normalized soft bits with each of a plurality of predefined bit sequences to obtain a plurality of correlations, see action 81. Next, a maximum correlation amplitude is selected out of the pluralities of correlations, see action 82. Next in an action 83, the maximum correlation is compared to a predefined threshold Th. If the maximum correlation amplitude is larger than the predefined threshold Th, a non-DTX is reported, see action 86, else a DTX is reported, see action 85.

Figure 9:
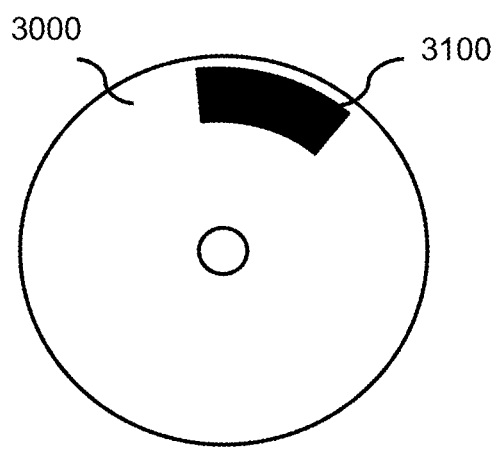
FIG. 9 shows a computer readable medium comprising a computer program product.

The method described above may partly or completely be implemented in a software program to be loaded into a processor. The software program may be stored on a computer readable medium. FIG. 9 shows a non-transitory computer readable medium 3000 embodying a a computer program product 3100 according to an embodiment. The computer program product 3100 comprises instructions for causing a processor apparatus to perform a method of DTX detection as described above. The computer program product 3100 may be embodied on the computer readable medium 3000 as physical marks or by means of magnetization of the non-transitory computer readable medium 3000. However, any other suitable embodiment is conceivable as well. Furthermore, it will be appreciated that, although the non-transitory computer readable medium 3000 is shown in FIG. 9 as an optical disc, the computer readable medium 3000 may be any suitable computer readable medium, such as a hard disk, solid state memory, flash memory, etc., and may be non-recordable or recordable.

In the foregoing specification, the invention has been described with reference to specific examples of embodiments of the invention. It will, however, be evident that various modifications and changes may be made therein without departing from the scope of the invention as set forth in the appended claims. The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1A and the discussion thereof describe an exemplary wireless communication architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between functional blocks are merely illustrative and that alternative embodiments may merge functional blocks or circuit elements or impose an alternate decomposition of functionality upon various functional blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The mere fact that certain measures are recited in mutually different claims does not indicate that a combination of these measures cannot be used to advantage.

The invention claimed is:

1. A network node of a wireless communication network, the network node comprising:
    a receiver arranged to receive an input signal from a remote transmitter of the wireless communication system via a wireless transmission channel;
    a signal to noise ratio calculator arranged to calculate a signal to noise ratio of the input signal;
    a soft bit normalizer arranged to determine a plurality of normalized soft bits using the input signal; and
    a discontinuous transmission (DTX) detector, connected with respective inputs to the signal to noise ratio calculator and the soft bit normalizer, the DTX detector being arranged to decide whether the input signal indicates that the signal transmission is in a DTX or in a non-DTX mode, and comprising:
        a primary detector connected with respective inputs to the signal to noise ratio calculator and the soft bit normalizer and arranged to detect a discontinuous transmission on the transmission channel using the plurality of the normalized soft bits and the signal to noise ratio, and an output for outputting, if a discontinuous transmission, DTX, on the transmission channel is detected, a signal indicating a DTX-detected decision, or else output a trigger signal; and
        a refinement detector, connected with a respective input to the output of the primary detector to receive the trigger from the primary detector, and arranged to decode the normalized soft bits and to generate a further decision about whether the signal indicates a discontinuous transmission on the transmission channel using the decoded normalized soft bits.

2. A network node according to claim 1, wherein the refinement detector comprises:
    a correlation decoder arranged to correlate the normalized soft bits with each of a plurality of predefined bit sequences to obtain a plurality of correlations;
    a maximum selector arranged to select a maximum correlation out of the pluralities of correlations; and
    a comparator arranged to compare the selected maximum correlation with a correlation threshold and for generating a DTX-detected decision if the maximum correlation is smaller than the correlation threshold.

3. A network node according to claim 2, wherein the primary detector comprises:
    a modulus calculator arranged to calculate a modulus of each normalized soft bit, to obtain a plurality of moduli;

an averaging unit arranged to average the plurality of moduli over a period equal to a Transmission Time Interval, to obtain an average value, C;

a metrics computer arranged to compute a DTX metric using a polynomial function of the average value, C;

a threshold computer arranged to compute a threshold, E, using a polynomial function of the signal to noise ratio; and a comparator arranged to decide that the signal indicates a discontinuous transmission if the threshold, E, is larger than a value of the DTX metric, or else decide that the signal does not indicate a discontinuous transmission.

4. A network node according to claim 3, wherein the DTX metric is calculated using the formula:

$D = a_1 \times C + a_2 \times C^2$, with D being the value of the DTX metric, C being the average and $a_1$ and $a_2$ being real numbered coefficients.

5. A network node according to claim 4, wherein a value of the coefficient $a_1$ lies between −3.5 and −2.5.

6. A network node according to claim 5, wherein a value of the coefficient $a_2$ lies between 32 and 33.

7. A network node according to claim 1 wherein the transmission channel is an enhanced dedicated physical control channel (E-DPCCH) channel in a universal mobile telecommunications system (UMTS) network.

8. A network node according to claim 1 wherein the signal to noise ratio calculator comprises://
a receiver arranged to receive a further input signal on an adjacent channel, the further signal comprising a pilot sequence of known bits;

a further signal to noise ratio calculator arranged to calculate a further signal to noise ratio on the adjacent channel using the pilot sequence; and a converter arranged to convert the further signal to noise ratio into the signal to noise ratio.

9. A network node according to claim 8, wherein the converter is arranged to convert the further signal to noise ratio into the signal to noise ratio using a predetermined conversion factor.

10. A network node according to claim 9, wherein the adjacent channel is an Uplink Dedicated Physical Control Channel and wherein the signal to noise ratio is calculated using:

$$SNR_{EDPCCH} = \beta_{ec} * SNR_{DPCCH}$$

with $SNR_{EDPCCH}$ being the signal to noise ratio,
$SNR_{DPCCH}$ being the further the signal to noise ratio on the Uplink Dedicated Physical Control Channel,
$\beta_{ec}$ being a power ratio.

11. A method of Discontinuous Transmission detection on a transmission channel in a wireless communication network, the method comprising:

receiving, at a receiver, an input signal via the transmission channel;

calculating, by a signal to noise ratio calculator, a signal to noise ratio of the transmission channel;

determining, by a soft bit normalizer, a plurality of normalized soft bits using the input signal;

making, by a discontinuous transmission (DTX) detector, a decision about whether the input signal indicates a discontinuous transmission on the transmission channel using the plurality of the normalized soft bits and the signal to noise ratio; and if the input signal does not indicate a discontinuous transmission on the transmission channel:
decoding, by a refinement detector, the normalized soft bits; and making, by the refinement detector, a further decision about whether the input signal indicates a discontinuous transmission on the transmission channel using the decoded normalized soft bits.

12. A method according to claim 11, wherein the decoding of the normalized soft bits comprises:
correlating the normalized soft bits with each of a plurality of predefined bit sequences to obtain a plurality of correlations.

13. A method according to claim 12, wherein the making of the decision comprises:
calculating a modulus of each normalized soft bit, to obtain a plurality of moduli;
averaging the plurality of moduli over a period equal to a Transmission Time Interval, to obtain an average value, C;
computing a discontinuous transmission (DTX) metric using a polynomial function of the average value, C;
computing a threshold, E, using a polynomial function of the signal to noise ratio; and
deciding that the signal indicates a discontinuous transmission if the threshold, E, is larger than a value of the DTX metric, or else deciding that the signal does not indicate a discontinuous transmission.

14. A method according to claim 13, wherein the DTX metric is calculated using the formula:

$D = a_1 \times C + a_2 \times C^2$, with D being the value of the DTX metric, C being the average and $a_1$ and $a_2$ being real numbered coefficients.

15. A method according to claim 14, wherein a value of the coefficient $a_1$ lies between −3.5 and −2.5.

16. A method according to claim 15, wherein a value of the coefficient $a_2$ lies between 32 and 33.

17. A method according claim 16, wherein the transmission channel is a enhanced dedicated physical control channel (E-DPCCH) channel in a universal mobile telecommunications system (UMTS) network.

18. A method according to claim 17, wherein the calculating of the signal to noise ratio on the transmission channel comprises:
receiving a further input signal on an adjacent channel, the further signal comprising a pilot sequence of known bits;
calculating a further signal to noise ratio on the adjacent channel using the pilot sequence; and
converting the further signal to noise ratio into the signal to noise ratio.

19. A method according to claim 18, wherein the adjacent channel is an Uplink Dedicated Physical Control Channel and wherein the signal to noise ratio is calculated using:

$$SNR_{EDPCCH} = \beta_{ec} * SNR_{DPCCH}$$

with $SNR_{EDPCCH}$ being the signal to noise ratio,
$SNR_{DPCCH}$ being the further the signal to noise ratio on the Uplink Dedicated Physical Control Channel,
$\beta_{ec}$ being a power ratio.

20. A non-transitory computer readable medium embodying a computer program product comprising instructions for causing a processor system to perform a method, the method comprising:
receiving, at a receiver, an input signal via the transmission channel;
calculating, by a signal to noise ratio calculator, a signal to noise ratio of the transmission channel;
determining, by a soft bit normalizer, a plurality of normalized soft bits using the input signal;
making, by a discontinuous transmission (DTX) detector, a decision about whether the input signal indicates a discontinuous transmission on the transmission channel using the plurality of the normalized soft bits and the signal to noise ratio; and if the input signal does not indicate a discontinuous transmission on the transmission channel:
 decoding, by a refinement detector, the normalized soft bits; and
 making, by the refinement detector, a further decision about whether the input signal indicates a discontinuous transmission on the transmission channel using the decoded normalized soft bits.

* * * * *